(12) United States Patent
Jaaskelainen (10) Patent No.: US 11,473,372 B2
(45) Date of Patent: Oct. 18, 2022

(54) AUTOMATIC CABLE AND DEVICE DEPLOYMENT SYSTEM

(71) Applicant: Halliburton Energy Services, Inc., Houston, TX (US)

(72) Inventor: Mikko Jaaskelainen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 117 days.

(21) Appl. No.: 17/072,467

(22) Filed: Oct. 16, 2020

(65) Prior Publication Data

US 2022/0120142 A1 Apr. 21, 2022

(51) Int. Cl.
*E21B 17/02* (2006.01)
*B23K 20/10* (2006.01)

(52) U.S. Cl.
CPC ............ *E21B 17/026* (2013.01); *B23K 20/10* (2013.01)

(58) Field of Classification Search
CPC .............................. E21B 17/026; B23K 20/10
See application file for complete search history.

(56) References Cited

U.S. PATENT DOCUMENTS

| 7,854,414 | B2* | 12/2010 | Head ..................... E21B 17/026 24/20 R |
| 8,236,217 | B2* | 8/2012 | Evans ................. B32B 38/0012 425/388 |
| 9,470,083 | B2 | 10/2016 | Jääskeläinen |
| 10,105,789 | B2* | 10/2018 | Wang .................. B29C 66/1122 |
| 10,669,835 | B2 | 6/2020 | Jaaskelainen |
| 2015/0337605 | A1* | 11/2015 | Longbottom ......... E21B 17/026 166/380 |
| 2016/0209584 | A1* | 7/2016 | Vincelette ............ G02B 6/4415 |
| 2017/0129062 | A1* | 5/2017 | Caldwell ................ B23K 20/10 |
| 2017/0225275 | A1* | 8/2017 | Hwang ................ B23K 31/125 |
| 2019/0055833 | A1* | 2/2019 | Jaaskelainen ........... E21B 47/01 |
| 2019/0134739 | A1* | 5/2019 | Cain ...................... E21B 17/02 |

* cited by examiner

*Primary Examiner* — Nicole Coy
(74) *Attorney, Agent, or Firm* — Kilpatrick Townsend & Stockton LLP (57) ABSTRACT

A method performed during a run-in-hole process for a casing section includes applying pressure to a cable against an outer portion of the casing section. Additionally, the method includes ultrasonic welding the cable to the outer portion of the casing section while the pressure is applied to the cable against the outer portion of the casing section.

19 Claims, 7 Drawing Sheets

AUTOMATIC CABLE AND DEVICE DEPLOYMENT SYSTEM

TECHNICAL FIELD

The present disclosure relates generally to systems and methods for use in a well environment and, more particularly (although not necessarily exclusively), to automatically installing cable and devices to sections of casing during a run-in-hole operation of the well environment.

BACKGROUND

Cables and other devices may be deployed along with casing and other tubing within a wellbore. The cables and devices may be used within the wellbore for measurement operations of a downhole environment and for communication operations from within the wellbore to a surface of the wellbore. Costs associated with deploying the cables, devices, and casing within a wellbore may increase as an outer diameter of the wellbore that is sized to receive the cables, devices, and casing also increases. Further, costs of deploying these well elements may also increase due to downtime during a run-in-hole operation of the wellbore associated with deploying the cables and devices.

DETAILED DESCRIPTION

Certain aspects and examples of the present disclosure relate to deploying cables, devices, and casing within a wellbore. The cables and devices may be coupled to the casing using an ultrasonic welding system. In an example, the cables may be fiber optic cables that are deployed within a wellbore for sensing downhole conditions and for communicating information from within the wellbore to a surface of the wellbore. The devices may include electro-acoustic transducers that are attached to points on the casing near to the cables. The electro-acoustic transducers may house sensors and an acoustic transmitter. The acoustic transmitter may transmit sensed information to the cable, such as a fiber optic cable, for transmission to the surface of the wellbore. Further, the casing may be a large-diameter pipe that is installed within the wellbore. The casing may be able to withstand a variety of forces acting on the wellbore to assist in maintaining the integrity of the wellbore.

Ultrasonically welding the cables and devices to the casing during the run-in-hole operation may provide significant cost and time savings during the run-in-hole operation. For example, by coupling the cables and devices to the casing using an ultrasonic spot weld, rather than a cable clip, an outer-diameter of the casing with the attached cables and devices may be reduced. Reducing the outer-diameter of the casing may result in a reduction in a borehole diameter of the wellbore, and the reduction in the borehole diameter may reduce drilling costs of the wellbore. Further, performing the ultrasonic welding operation while the run-in-hole operation is performed may also provide cost and time savings by limiting down-time during the run-in-hole operation of the casing.

In an example, ultrasonic welding on a rig floor at a well location may be used to weld a fiber optic cable and various electro-acoustic transducer modules to casing during a run-in-hole operation of the casing. An ultrasonic welding assembly may be used to attach the fiber optic cable to the casing. During the ultrasonic welding process, an ultrasonic weld head may vibrate tens of thousands of times per second. The oscillations may be transferred to a contact surface that is in direct contact with elements that are ultrasonically welded together. Because the boundary of the welding area has a large acoustic impedance, the ultrasonic waves at the welding area produce high temperatures. With the application of pressure to the welding site and an ultrasonic signal from the weld head, portions of two elements being welded together transition from solids to liquids and are blended together. Once the ultrasonic signal is stopped, the portions of the two elements return to a solid state. The ultrasonic weld may be completed in tens or hundreds of milliseconds. Ultrasonic welding may be a fast, clean, efficient, and repeatable process that consumes very little energy. In an example, the ultrasonic welding process may avoid the use of solvents, adhesives, mechanical fasteners, or other consumables.

As described herein, the cables, such as fiber optic cables, may be ultrasonically welded onto a section of steel casing, such as a P110 alloy casing section, during a run-in-hole operation of the casing. Accordingly, the ultrasonic welding operation may run at the rate of the run-in-hole operation. In other words, the ultrasonic welding operation may be performed by a weld head assembly, where the individual weld heads are able to travel along with the casing at the rate of the run-in-hole operation while completing an ultrasonic weld.

In an example, the weld head assembly may be deployed using a rotatable track design. The rotatable track design may include a suspension system that enables tracking of casing and coupling outer-diameter variations. The individual weld heads of the weld head assembly may be embedded in the rotatable track. For example, the individual weld heads may be recessed in the rotatable track and extended form the rotatable track once sensors indicate that a location of the individual weld head abuts a flat surface and not on a transition between the casing sections and coupling sections. Such an extension of the weld heads can be performed pneumatically using a pneumatic actuator or electrically using a piezo-electric stack actuator. Once the weld heads are extended, the ultrasonic welding operation may be performed between the casing and the cable.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
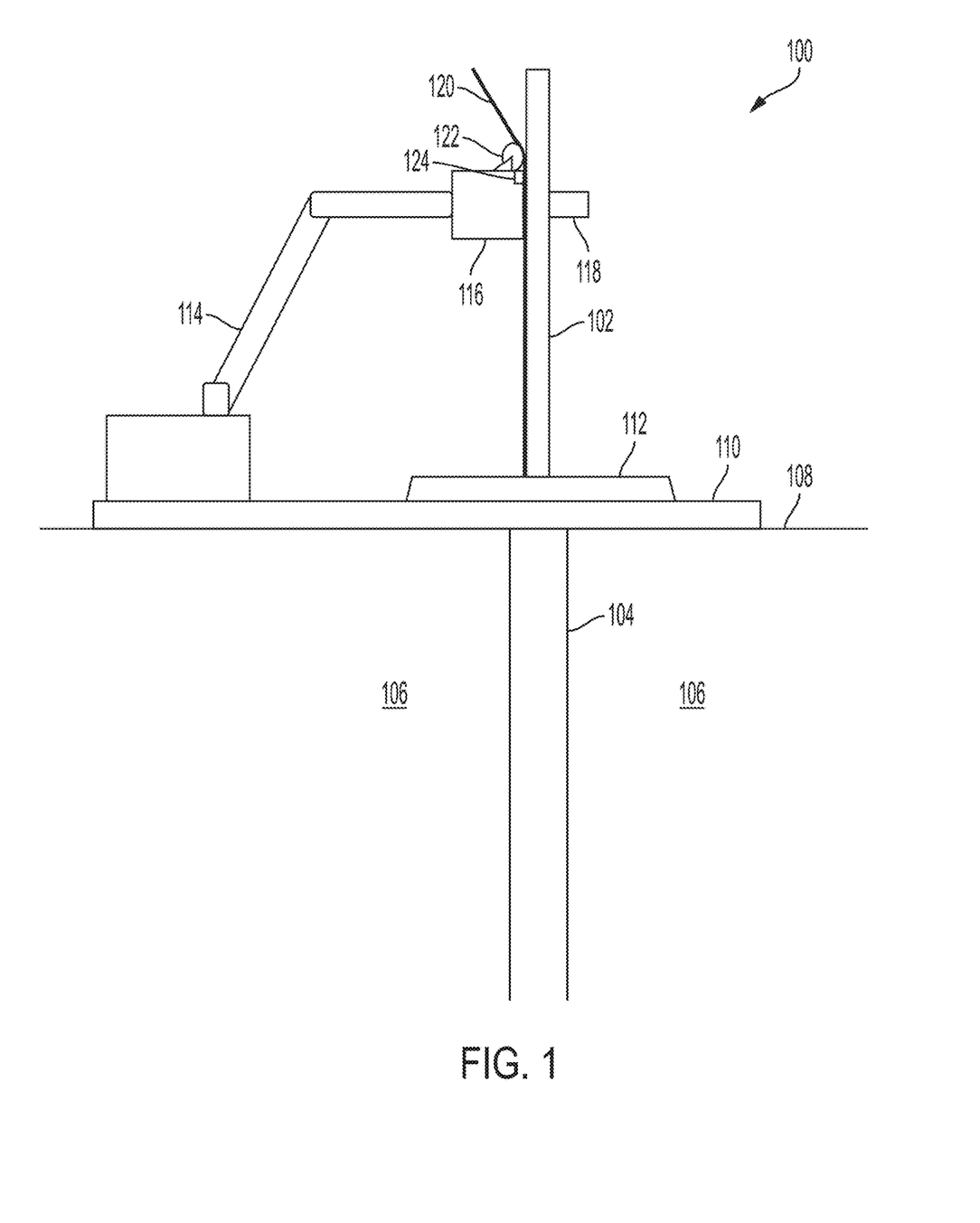
FIG. 1 is a schematic view of a well system deploying casing within a wellbore according to one example of the present disclosure.

FIG. 1 is a schematic view of a well system 100 deploying casing 102 within a wellbore 104 according to one example of the present disclosure. The wellbore 104 may extend through various earth strata in an oil and gas formation 106 (e.g., a subterranean formation) located below the well surface 108. The wellbore 104 may be formed of a single bore or multiple bores extending into the formation 106, and disposed in any orientation. The well system 100 can include a rig floor 110 and a rotary table 112 through which the casing 102 is run into the wellbore 104 during a run-in-hole operation of the casing 102.

In an example, the rig floor 110 can include a robotic arm 114 with a weld head assembly 116, which is proximate to the casing 102, coupled to an end of the robotic arm 114. In an example, the robotic arm 114 may include a casing holder 118. In an additional example, the casing holder 118 may be a separate component from the robotic arm 114. The casing holder 118 may support the casing 102 while the weld head assembly 116 applies pressure to a cable 120 against the casing 102 during an ultrasonic welding operation. The casing holder 118 may be a c-hook anvil, and the cable 120 may be a fiber optic cable that is encapsulated in a soft metal, such as aluminum. The soft-metal encapsulation of the fiber optic cable may promote the ultrasonic welding process between the cable 120 and the casing 102.

To ensure that the cable 120 aligns correctly with the casing 102 and the weld head assembly 116, a sheave 122 may be positioned at the weld head assembly 116 to receive and align the cable 120 for the ultrasonic welding operation. As the casing 102 is run into the wellbore 104 during the run-in-hole operation, the weld head assembly 116 may perform the ultrasonic welding operation. For example, the weld head assembly 116 may include a plurality of weld heads that are each able to maintain a welding engagement with the cable 120 and the casing 102 during the run-in-hole operation, as discussed in greater detail below with respect to FIGS. 2-4.

In an example, the weld head assembly 116 may include sensors 124 that assist in positioning individual weld heads against the cable 120 and the casing 102. For example, the sensors 124 may include proximity sensors that allow the weld head assembly 116 to adjust positioning to maintain the weld head assembly 116 and individual weld heads of the weld head assembly 116 at a constant distance from the casing 102. In an example, the sensors 124 may detect a position of each weld head of the weld head assembly 116 with respect to the casing section and output a command to extend each weld head to engage with the cable 120 and the casing 102.

The sensors 124 may also include pressure sensors that ensure that the individual weld heads maintain an appropriate pressure between the cable 120 and the casing 102 throughout the ultrasonic welding operation. Further, the sensors 124 may include sensors capable of detecting a run-in-hole speed of the casing 102. By detecting the run-in-hole speed of the casing 102, the weld head assembly 116 may maintain a similar speed of the individual weld heads during the ultrasonic welding operations such that the individual weld heads are maintained in the same position relative to the casing 102. By maintaining the weld heads in the same position relative to the casing 102, the weld heads may complete the ultrasonic welding operation without stopping the run-in-hole operation of the casing 102. In some examples, coupling the cable 120 to the casing 102 may involve using other welding techniques in place of the ultrasonic welding operation described above. For example, the weld head assembly 116 may be replaced with a UV-curable epoxy assembly that is able to apply and cure UV-curable epoxy between the cable 120 and the casing 102. Operations around hydro-carbon wells may in some instances include release of explosive gases and it may be preferable to avoid weld operations where open arcs and other ignition sources are present. Ultrasonic and UV-curable welding techniques may reduce the risk of ignition in the presence of explosive gases or substances.

In some examples, the weld head assembly 116 may also ultrasonically weld electro-acoustic transducers to points on the casing 102 near to the cable 120. The electro-acoustic transducers may be ultrasonically welded to the casing 102 in a manner similar to the cable 120. In an example, the electro-acoustic transducers may house sensors and an acoustic transmitter. The sensors may include pressure sensors, temperature sensors, acceleration sensors, vibration sensors, strain sensors, chemical sensors, resistivity sensors, or a combination thereof. Further, electronics used to operate the sensor and the acoustic transmitter may be included within the electro-acoustic transducers. In some examples, the electronics of the electro-acoustic transducers may be powered by a battery disposed within the electro-acoustic transducer. The acoustic transmitter may transmit sensed information to the cable 120, such as a fiber optic cable, for transmission to the surface 108 of the wellbore 104. By placing the electro-acoustic transducers near the cable 120, minimal energy may be used by the electro-acoustic transducer to transmit acoustic signals to the cable 120. This limited use of energy to transmit acoustic signals to the cable 120 may extend battery life of the battery used to power the electronics of the electro-acoustic transducers.

The cable 120 may house one or several optical fibers, and the optical fibers may be single mode fibers, multi-mode fibers or a combination of single mode and multi-mode optical fibers. Fiber optic sensing systems (not shown) communicatively coupled at the surface 108 of the wellbore 104 to the cable 120 may include Distributed Temperature Sensing (DTS) systems, Distributed Acoustic Sensing (DAS) systems, Distributed Strain Sensing (DSS) systems, quasi-distributed sensing systems where multiple single point sensors are distributed along the cable 120, or single point sensing systems where the sensors are located at the end of the cable 120.

The fiber optic sensing systems communicatively coupled to the cable 120 may operate using various sensing principles including but not limited to: amplitude based sensing systems, such as DTS systems based on Raman scattering; phase sensing based systems, such as DAS systems based on interferometric sensing using, for example, homodyne or heterodyne techniques where the system may sense phase or intensity changes due to constructive or destructive interference; and strain sensing systems, such as DSS systems using dynamic strain measurements based on interferometric sensors or static strain sensing measurements. The DSS systems may rely on Brillouin scattering, quasi-distributed sensors (e.g., Fiber Bragg Gratings (FBGs) where a wavelength shift is detected or multiple FBGs that are used to form Fabry-Perot type interferometric sensors for phase or intensity based sensing), or single point fiber optic sensors based on Fabry-Perot, FBG, or intensity based sensors.

Electrical sensors may be pressure sensors based on quarts-type sensors, strain gauge based sensors, or other types of sensing technologies. Pressure sensors, either optical or electrical, may be housed in dedicated gauge mandrels or attached outside the casing 102 in various configurations for down-hole deployment. Various hybrid approaches where single point, quasi-distributed, or distributed fiber optic sensors are combined with, for example, electrical sensors are also contemplated. The cable 120 may also include a combination of optical fiber and electrical conductors.

Temperature measurements from, for example, a DTS system communicatively coupled to the cable 120 may be used to determine locations for fluid inflow in the wellbore 104, as the fluids from the surface 108 are likely to be cooler than formation temperatures. DTS warm-back analyses may be used to determine fluid volume placement. The DTS warm-back analyses may be performed for water injection wells, and the same analysis technique can be used for fracturing fluid placement. Additionally, temperature measurements in observation wells can be used to determine fluid communication between the treatment well and observation well or to determine formation fluid movement.

DAS data can be used to determine fluid allocation in real-time, as acoustic noise may be generated when fluid flows through the casing and in through perforations into the formation 106. Phase and intensity based interferometric sensing systems may be sensitive to temperature and mechanical as well as acoustically induced vibrations. DAS data can be converted from time-series data to frequency domain data using Fast Fourier Transforms (FFT), and other transforms, such as wavelet transforms, may also be used to generate different representations of the data. Various frequency ranges can be used for different purposes. For example, low frequency signal changes may be attributed to formation strain changes or fluid movement, and other frequency ranges may be indicative of fluid or gas movement.

Various filtering techniques may be applied to generate indicators of events detected along the cable 120 that may be of interest. Indicators may include formation movement due to growing natural fractures, formation stress changes during the fracturing operations known as stress shadowing, fluid seepage during the fracturing operation as formation movement may force fluid into an observation well, fluid flow from fractures, fluid and proppant flow from fracturing hits, etc. Each indicator may have a characteristic signature in terms of frequency content, amplitude, time dependent behavior, or a combination thereof. These indicators may also be present in other data types and not limited to DAS data.

DAS systems can also be used to detect various seismic events where stress fields, growing fracture networks, or a combination thereof generate microseismic events. The DAS systems may also detect perforation charge events used to determine travel time between horizontal wells, and the detected information can be used from stage to stage to determine changes in travel time as the formation is fractured and filled with fluid and proppant. The DAS systems may also be used with surface seismic sources to generate vertical seismic profiles before, during, and after a fracturing job to determine the effectiveness of the fracturing job as well as to determine production effectiveness.

DSS data can be generated using various approaches, and static strain data can be used to determine absolute strain changes over time. Static strain data may be often measured using Brillouin based systems or quasi-distributed strain data from an FBG based system. Static strain may also be used to determine propped fracture volume by looking at deviations in strain data from a measured strain baseline before fracturing a stage. It may also be possible to determine formation properties like permeability, poroelastic responses, and leak off rates based on the change of strain versus time and the rate at which the strain changes over time. Dynamic strain data can be used in real-time to detect fracture growth through an appropriate inversion model, and appropriate actions, such as dynamic changes to fluid flow rates in the treatment well, addition of diverters or chemicals into the fracturing fluid, or changes to proppant concentrations or types, can then be used to mitigate detrimental effects.

Fiber Bragg Grating (FBG) based systems may also be used for a number of different measurements. FBG based systems may be partial reflectors that can be used as temperature and strain sensors. The FBG based systems can also be used to make various interferometric sensors with very high sensitivity. FBG based systems can be used to make point sensors or quasi-distributed sensors where FBG based sensors can be used independently or with other types of fiber optic based sensors. FBG based systems can be manufactured into an optical fiber at a specific wavelength, and other systems, such as DAS, DSS or DTS systems, may operate at different wavelengths in the same fiber and measure different parameters simultaneously with the FBG based systems using Wavelength Division Multiplexing (WDM).

The sensors can be placed in either the treatment well or monitoring well(s) to measure well communication. The treatment well pressure, rate, proppant concentration, diverters, fluids, and chemicals may be altered to change the hydraulic fracturing treatment. These changes may impact the formation responses in several different ways. For example, stress fields may change, and such a change may generate microseismic effects that can be measured with DAS systems, single point seismic sensors like geophones, or a combination thereof. Additionally, fracture growth rates may change, and such a change can generate changes in measured microseismic events and event distributions over time or changes in measured strain. The changes in measured strain may be detected using a low frequency portion of the DAS signal or Brillouin based sensing systems. Further, pressure changes due to poroelastic effects may be measured in the monitoring well, pressure data may be measured in the treatment well and correlated to formation responses, and various changes in treatment rates and pressure may generate events that can be correlated to fracture growth rates. In some examples, several measurements can be combined to determine adjacent well communication, and this information can be used to change the hydraulic fracturing treatment schedule to generate desired outcomes. Further, while FIG. 1 depicts the well system 100 as operating in a land-based wellbore environment, the well system 100 may also be implemented in an offshore drilling environment.

Figure 2:
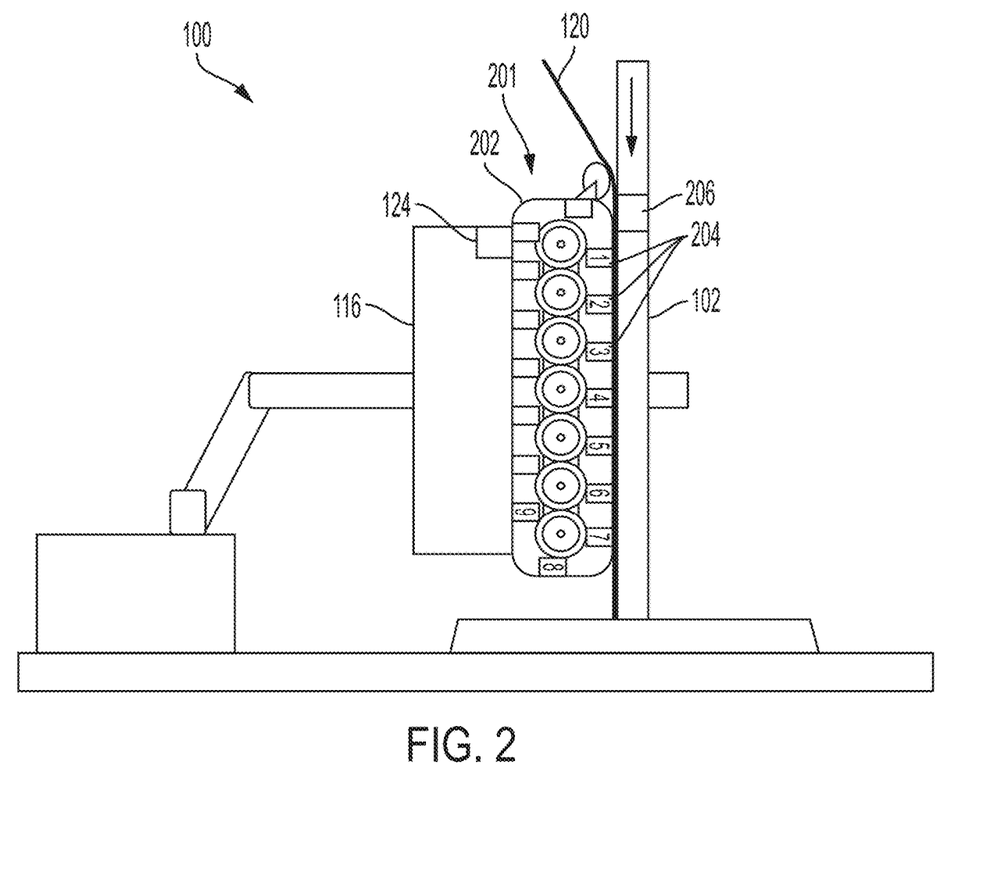
FIG. 2 is a schematic view of the well system of FIG. 1 including a weld head assembly at a first time period according to one example of the present disclosure.

FIG. 2 is a schematic view of the well system 100 including the weld head assembly 116 at a first time period according to one example of the present disclosure. The weld head assembly 116 may include a movable weld head housing 201 including a rotatable track 202 that is positioned to engage with the cable 120 and the casing 102. The rotatable track 202 may include a plurality of individual weld heads 204. Each of the individual weld heads 204 may be positioned within the rotatable track 202 such that the weld heads 204 are able to continuously perform ultrasonic welding operations between the cable 120 and the casing 102 during a run-in-hole operation of the casing 102.

In an example, the individual weld heads 204 may be recessed in the rotatable track 202 and extended form the rotatable track 202 once sensors 124, such as a proximity sensor, indicate that a location of the weld head 204 abuts a flat surface of the casing 102. For example, the sensors 124 may prevent ultrasonic welding on a transition between sections of the casing 102 and a coupling section 206, which provides a joint between sections of the casing 102. Extension of the weld heads 204 can be done pneumatically or electrically using a piezo-electric stack. Once the weld heads 204 are extended, the ultrasonic welding operation may be performed between the cable 120 and the casing 102 or a flat surface of the coupling section 206. The rotatable track 202 depicted in FIG. 2 includes sixteen weld heads 204, but the weld head assembly 116 may include more or fewer than sixteen weld heads 204 in operation.

Figure 3:
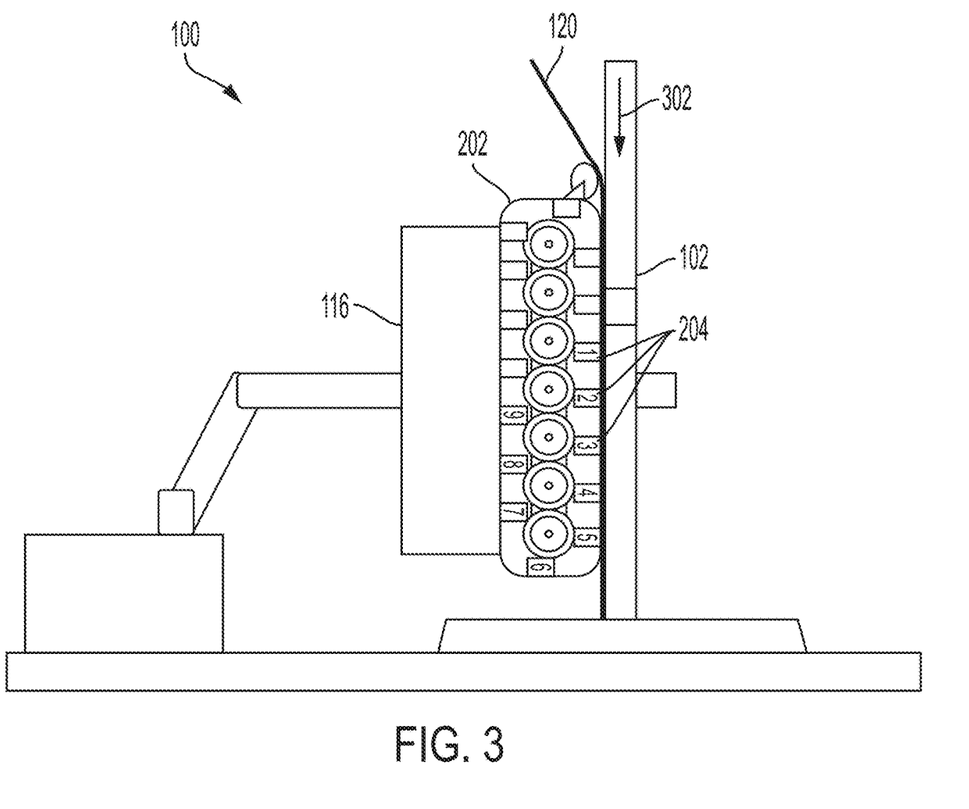
FIG. 3 is a schematic view of the well system of FIG. 1 including the weld head assembly of FIG. 2 at a second time period according to one example of the present disclosure.

FIG. 3 is a schematic view of the well system 100 including the weld head assembly 116 at a second time period according to one example of the present disclosure. As illustrated, the individual weld heads 204 may move in a clockwise direction around the rotatable track 202 during a transition from the first time period to the second time period. The movement of the weld heads 204 around the rotatable track 202 may enable the weld heads 204 to maintain a constant position along the casing 102 while the casing 102 is run in a direction 302 during the run-in-hole operation of the casing 102.

By maintaining the constant position along the casing 102, the weld heads 204 are able to maintain contact with a weld site of the cable 120 and the casing 102 during an entirety of the ultrasonic welding operation. For example, the weld heads 204 may maintain pressure against the cable 102 after the initial ultrasonic weld while an encapsulation of the cable 102 and a portion of the casing 102 transition from a liquid state resulting from the ultrasonic vibrations of the weld heads 204 back to a solid state. In this manner, the ultrasonic weld between the cable 120 and the casing 102 is completed without halting the run-in-hole progress of the casing 102.

Figure 4:
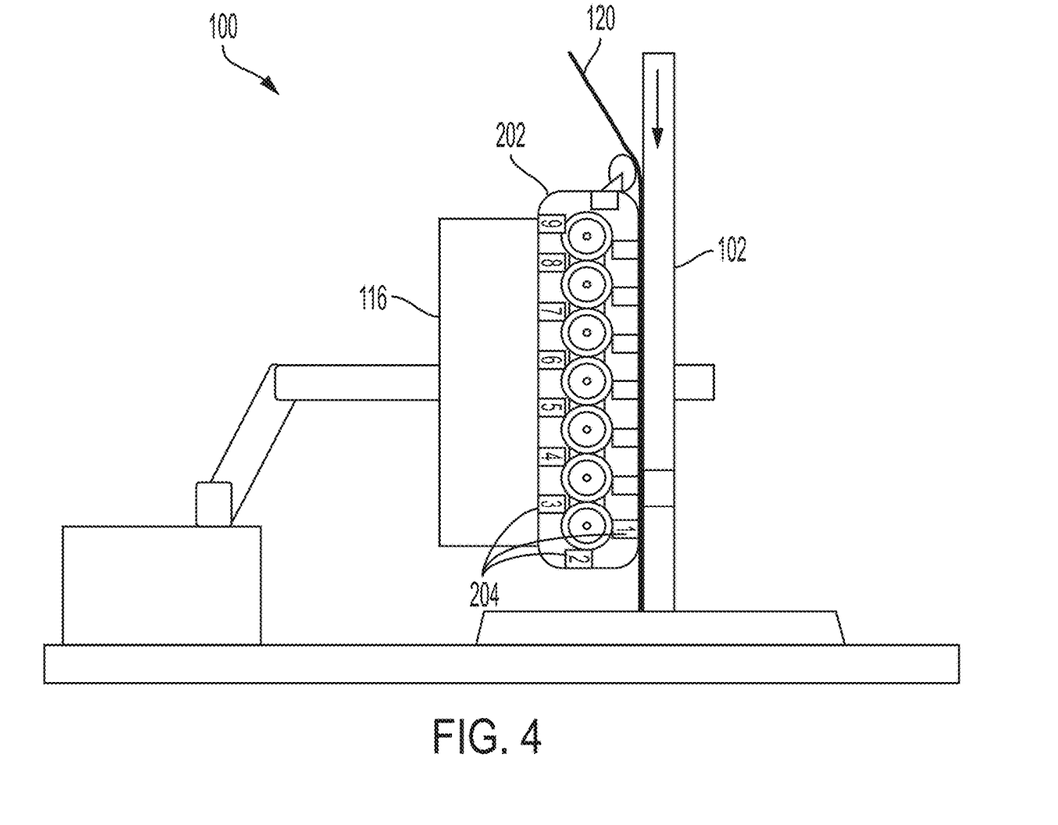
FIG. 4 is a schematic view of the well system of FIG. 1 including the weld head assembly of FIG. 2 at a third time period according to one example of the present disclosure.

FIG. 4 is a schematic view of the well system 100 including the weld head assembly 116 at a third time period according to one example of the present disclosure. As illustrated, the individual weld heads 204 may move further in a clockwise direction around the rotatable track 202 during a transition from the second time period to the third time period. The rotatable track 202 may continue to rotate in a clockwise direction while the casing 102 continues the run-in-hole operation without stoppage associated with the ultrasonic welding operations of the weld heads 204.

Figure 5:
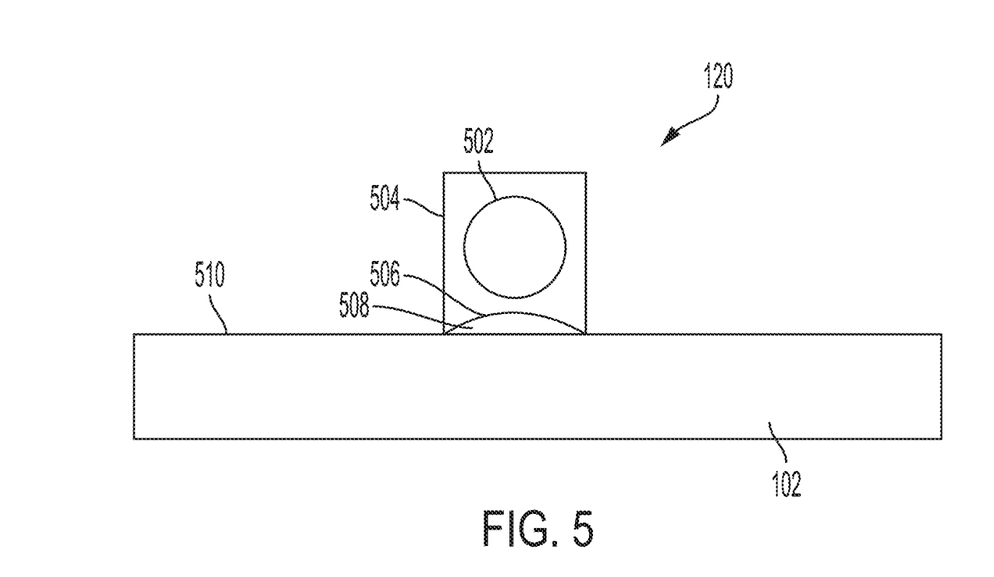
FIG. 5 is a schematic view of a cross-section of a cable that is able to ultrasonically weld to a casing section according to one example of the present disclosure.

FIG. 5 is a schematic view of a cross-section of the cable 120 that is able to ultrasonically weld to the casing 102 according to one example of the present disclosure. In an example, the cable 120 includes a core 502 and an encapsulation 504. The core 502 may be a fiber optic cable, an electrical cable, or a hybrid cable that includes both fiber optic and electrical components.

Further, the encapsulation 504 may be a soft-metal encapsulation of the core 502. Because the casing 102 may be a steel alloy, such as a P110 alloy, the material of the encapsulation 504 may be selected to encourage the ultrasonic welding operation. For example, the encapsulation 504 may be made of aluminum, a thermoplastic, or another soft metal. Additionally, the encapsulation 504 may include a pocket 508. The pocket 508 may be filled with a filling 508 such as solder with flux or a thermally activated epoxy or glue. The filling 508 may encourage a good bond between the encapsulation 504 and the casing 102 given that a surface 510 of the casing 102 may be oxidized. The pocket may be in different shapes or the solder with flux or the thermally activated epoxy or glue may be attached to one flat side of the cable 120, the encapsulation 504, or both. In some instances, the weld-head 116 may include an assembly for injecting epoxy or glue in close proximity of the cable 120 and casing 102 or between the cable 120 and the casing 102 to enable UV welding. In additional examples, the surface 510 of the casing 102 may be abrasively treated or coated with a substance to prime a contact area with the cable 120.

In an example, the encapsulation 504 includes a square cross-section. The square cross-section of the encapsulation 504 may be 11 mm by 11 mm. In another example, the square cross-section of the encapsulation may be 5 mm by 5 mm or 6 mm by 6 mm to encapsulate the core 502 that has a 4 mm outer diameter. Other sizes of the square cross-section are also possible. The square cross-section of the encapsulation 504 may provide a shape such that edges of the encapsulation 504 contact the casing 102 and absorb energy from the weld heads 204 before the casing 102. This may ensure that the encapsulation 504, the filling 508, or both transition to a liquid state to form an adequate bond with the casing 102. In an example, the electro-acoustic transducers capable of being ultrasonically welded to the casing 102 may also include a similar shape and material arrangement to the cable 120 to complement the ultrasonic welding process.

The encapsulation 504, such as an aluminum encapsulation, may provide the weld heads 204 with the ability to adjust a welding shape and time based on the run-in-hole speed of the casing 102. The welding shape and time may be controlled based on a transducer to horn chain for energy delivery by the weld heads 204, based on pressure applied by the weld head 204, based on a weld length of time according to the material and shape of the encapsulation 504 and the casing 102, and based on a hold time for the weld head 204 to apply pressure to the cable 120 to allow the welded portions to cool and set.

Figure 6:
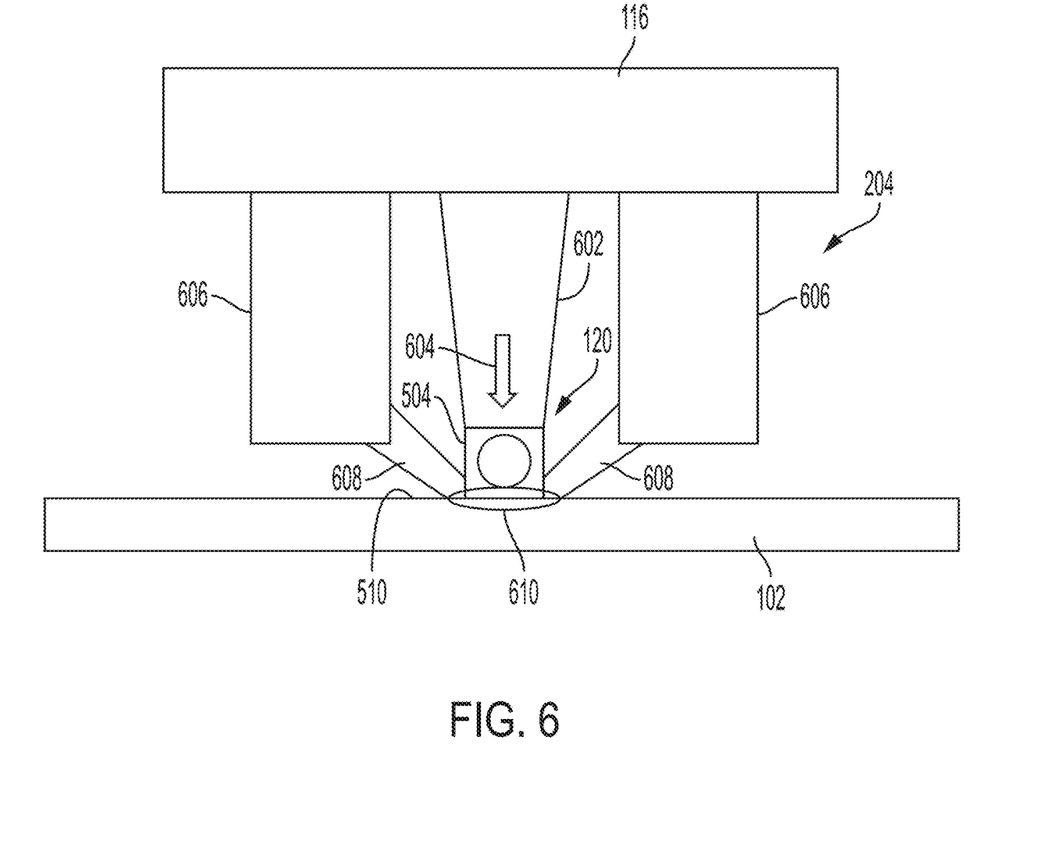
FIG. 6 is a schematic view of a weld head used to ultrasonic weld the cable of FIG. 5 to a casing section according to one example of the present disclosure.

FIG. 6 is a schematic view of an example of the weld head 204 used to ultrasonic weld the cable 120 to the casing 102 according to one example of the present disclosure. The weld head 204 may be positioned within the rotatable track 202 described above with respect to FIGS. 2-4. In an example, the weld head 204 may include a piston 602 that applies pressure in a direction 604 on the cable 120 during an ultrasonic welding operation. The weld head 204 also includes one or more transducer, converter, booster, and sonotrode modules 606. The modules 606 are coupled to horns 608 that are, in turn, positioned to abut the cable 120 and the casing 102 to output the ultrasonic frequency for the ultrasonic welding operation. The horns 608 may be made from aluminum or titanium.

In an example, the horns 608 vibrate at a frequency between 20 kHz and 40 kHz for a pre-determined amount of time. The pre-determined amount of time, which may be referred to as a weld time, may be established based on the material of the cable 120 and the casing 102 and the output frequency of the horns 608. The pre-determined amount of time may be an amount of time for the material of the cable 120 and the casing 102 to transition from a solid state to a liquid state as a result of the frequency of the horns 608. Further, the pressure applied by the piston 602 may be also be maintained for a pre-determined amount of time after the vibration of the horns 608 stops. A time spent maintaining the pressure applied by the piston 602 may be referred to as a hold time. The hold time may be an amount of time for the material to transition from the liquid state to the solid state after the horns 608 stop vibrating. In an example, the pre-determined amount of time for vibrating the horns 608 and the hold time may be equal to an amount of time that the weld head 204 is maintained in contact with the cable 120 and the casing 102 by the rotatable track 202.

An area 610 between the cable 120 and the casing 102 may be where the horns 608 focus the ultrasonic energy for the ultrasonic welding operation. The horns 608 may direct the energy into the encapsulation 504 of the cable 120 and the surface 510 of the casing 102 to heat the encapsulation 504 and the casing 102. While the piston 602 exerts pressure on the cable 120 such that the heated encapsulation 504 forms to the slightly circular casing surface. In an example, the horns 608 may be shaped such that the horns 608 do not touch the surface 510 of the casing 102. In an additional example, the horns 608 may include a coating that prevents the horns 608 from contacting the surface 510 of the casing 102 and becoming stuck to the casing 102.

Figure 7:
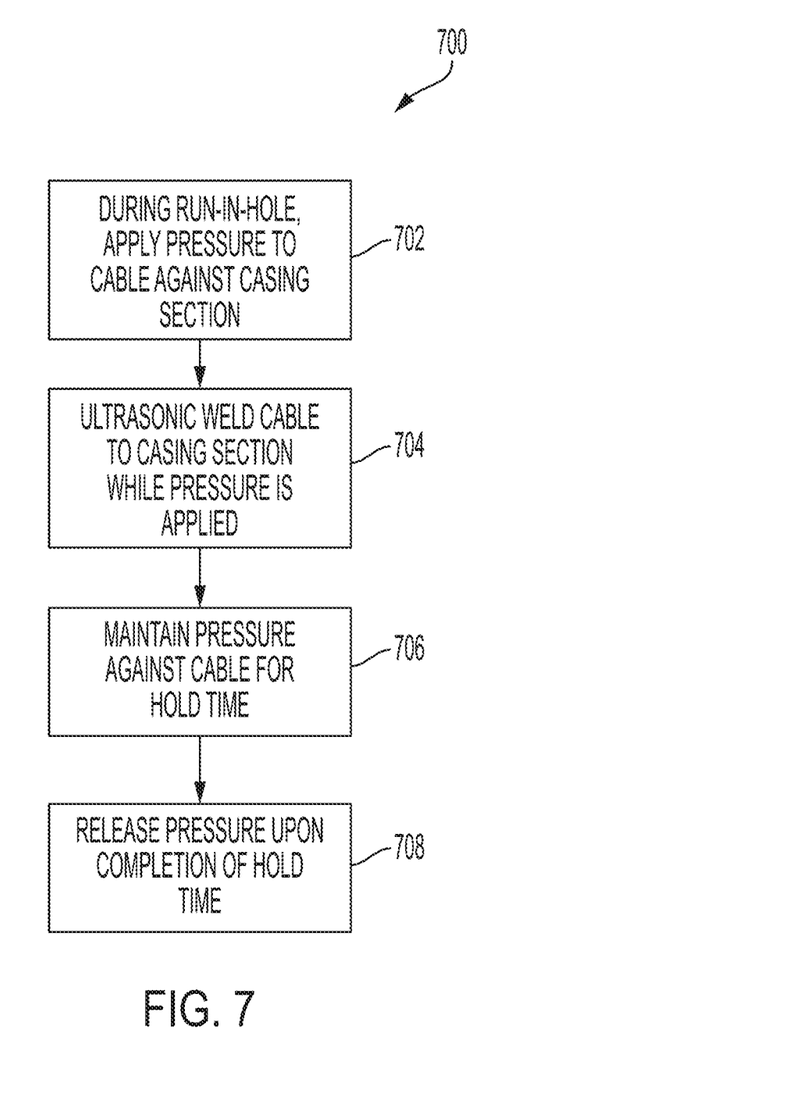
FIG. 7 is a flowchart of a process for ultrasonically welding a cable to a casing section according to one example of the present disclosure.

FIG. 7 is a flowchart of a process 700 for ultrasonically welding the cable 120 to a section of casing 102 according to one example of the present disclosure. At block 702, the process 700 involves applying pressure to the cable 120 against the casing 102 during a run-in-hole operation of the casing 102. The pressure may be applied by a piston 602 of the weld head 204 of the weld head assembly 116. In an example, the weld head 204 may apply the pressure when the weld head 204 is extended from the rotatable track 202 pneumatically using a pneumatic actuator or electrically using a piezo-electric stack actuator.

At block 704, the process 700 involves ultrasonic welding the cable 120 to a section of the casing 102 while the pressure remains applied to the cable 120 against the casing 102. The ultrasonic welding operation may be performed by vibrating the horns 608 of the weld head 204. For example, the horns 608 may be in contact with the encapsulation 504 of the cable 120, and the horns may vibrate at a frequency between 20 kHz and 40 kHz. The vibration of the horns 608 may continue for a pre-determined amount of time until portions of the encapsulation 504 and the surface 510 of the casing 102 transition from a solid state to a liquid state.

At block 706, the process 700 involves maintaining the pressure against the cable 120 for a hold time. In an example, the piston 602 may maintain the pressure on the cable 120 after the horn 608 stops vibrating. The piston 602 may continue to maintain the pressure until the portions of the encapsulation 504 and the surface 510 of the casing 102 transition from the liquid state back to the solid state.

At block 708, the process 700 involves releasing the pressure applied to the cable 120 upon completion of the hold time. In an example, releasing the pressure may involve the weld head 204 being removed from contact with the cable 120 as the rotatable track 202 rotates the weld head 204 away from the casing 102. In an additional example, the weld head 204 may be retracted to a position within the rotatable track 202, either pneumatically or electrically, such that the piston 602 no longer applies the pressure to the cable 120.

In one or more examples, each of the blocks 702-708 may be performed while the run-in-hole operation of the casing 102 continues. That is, the described ultrasonic welding operation may avoid adding stoppage time to the run-in-hole operation.

In some aspects, methods and systems for ultrasonically welding a cable to a casing during a run-in-hole operation are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a method comprising: during a run-in-hole process for a casing section, applying pressure to a cable against an outer portion of the casing section; and ultrasonic welding the cable to the outer portion of the casing section while the pressure is applied to the cable against the outer portion of the casing section.

Example 2 is the method of example 1, further comprising: subsequent to ultrasonic welding the cable to the outer portion of the casing section, maintaining the pressure to the cable against the outer portion of the casing section for a hold time; and subsequent to the hold time, releasing the pressure from the cable against the outer portion of the casing section.

Example 3 is the method of examples 1-2, wherein ultrasonic welding the cable to the outer portion of the casing section while the pressure is applied to the cable against the outer portion of the casing section is performable without halting the run-in-hole process.

Example 4 is the method of examples 1-3, wherein the pressure is applied to the cable against the outer portion of the casing section using a piston of a weld head.

Example 5 is the method of example 4, wherein ultrasonic welding the cable to the outer portion of the casing section while the pressure is applied to the cable against the outer portion of the casing section comprises: performing, using a horn of the weld head, an ultrasonic weld in which the horn vibrates at between 20 kHz and 40 kHz for a pre-determined amount of time, the pre-determined amount of time being a weld time; holding, by the weld head, the cable against the outer portion of the casing section for a hold time for allowing cooling to occur; and retracting the weld head, upon completion of the hold time, from the cable and the outer portion of the casing section, the cable and the outer portion of the casing section being welded together.

Example 6 is the method of examples 1-5, further comprising: during the run-in-hole process for the casing section, applying pressure to an electro-acoustic transducer against an outer portion of the casing section; and ultrasonic welding the electro-acoustic transducer to the outer portion of the casing section while the pressure is applied to the electro-acoustic transducer against the outer portion of the casing section.

Example 7 is the method of examples 1-6, wherein the cable comprises a core and a cable encapsulation surrounding the core, and wherein the cable encapsulation comprises a pocket that holds a soldering material, an epoxy, a glue, or a combination thereof.

Example 8 is an ultrasonic weld head assembly comprising: a movable weld head housing with a plurality of weld heads mounted on a rotatable track, the plurality of weld heads being extendable from the movable weld head housing for ultrasonic welding a cable to an outer portion of a casing section during a run-in-hole process; and at least one sensor positionable to detect a position of each weld head of the plurality of weld heads with respect to the casing section and output a command to extend each weld head of the plurality of weld heads.

Example 9 is the ultrasonic weld head assembly of example 8, wherein the movable weld head housing is positionable to perform operations comprising: performing an ultrasonic weld in which a horn of each weld head of the plurality of weld heads vibrates at between 20 kHz and 40 kHz for a pre-determined amount of time.

Example 10 is the ultrasonic weld head assembly of examples 8-9, wherein each weld head of the plurality of weld heads comprises: a piston positionable to apply pressure to the cable toward the casing section; and a horn positionable to perform an ultrasonic weld between the cable and the outer portion of the casing section.

Example 11 is the ultrasonic weld head assembly of example 10, wherein the horn is further positionable to contact the cable during an ultrasonic welding operation and to avoid contact with the outer portion of the casing section during the ultrasonic welding operation.

Example 12 is the ultrasonic weld head assembly of examples 8-11, further comprising: a sheave positionable to direct the cable into an alignment between the cable and the outer portion of the casing section.

Example 13 is the ultrasonic weld head assembly of examples 8-12, further comprising: a casing holder positionable to maintain the casing section against the movable weld head housing.

Example 14 is the ultrasonic weld head assembly of examples 8-13, wherein the plurality of weld heads are extendable from the movable weld head housing using a pneumatic actuator or a piezo-electric stack actuator.

Example 15 is a system comprising: a robotic arm positionable on a rig floor of a hydrocarbon well system; an ultrasonic welding assembly positionable on the robotic arm; and a casing holder positionable to maintain a casing section against the ultrasonic welding assembly.

Example 16 is the system of example 15, wherein the ultrasonic welding assembly comprises: a movable weld head housing with a plurality of weld heads mounted on a rotatable track, the plurality of weld heads being extendable from the weld head housing for ultrasonic welding a cable to an outer portion of the casing section during a run-in-hole process; and at least one sensor positionable to detect a position of each weld head of the plurality of weld heads with respect to the casing section and output a command to extend each weld head of the plurality of weld heads.

Example 17 is the system of examples 15-16, wherein the robotic arm and the ultrasonic welding assembly are usable for ultrasonic welding a cable to an outer portion of the casing section during a run-in-hole process, and wherein an ultrasonic weld of the cable to the outer portion of the casing section is completed without stopping the run-in-hole process.

Example 18 is the system of examples 15-17, wherein the casing holder comprises a c-hook anvil.

Example 19 is the system of example 18, wherein the ultrasonic welding assembly comprises a horn and a piston, and wherein the robotic arm and the ultrasonic welding assembly are positionable to perform operations comprising: clamping a cable against an outer portion of the casing section between the ultrasonic welding assembly and the c-hook anvil; performing an ultrasonic weld in which the horn vibrates at a frequency between 20 kHz and 40 kHz for a pre-determined amount of time; holding, by the piston, the cable against the outer portion of the casing section for a hold time for allowing cooling to occur; and retracting the piston, after the hold time, from the cable and the outer portion of the casing section, the cable and the outer portion of the casing section being welded together.

Example 20 is the system of example 19, wherein the horn of the ultrasonic welding assembly is positionable to contact the cable during performance of the ultrasonic weld and to avoid contact with an outer portion of the casing section during performance of the ultrasonic weld.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
   ultrasonic welding, by a plurality of weld heads extended from a rotatable track of an ultrasonic weld head assembly, a cable to an outer portion of a casing section during a run-in-hole process for the casing section;
   detecting, by at least one sensor, a position of each weld head of the plurality of weld heads with respect to the casing section; and
   outputting, by the at least one sensor, a command to extend each weld head of the plurality of weld heads.

2. The method of claim 1, further comprising:
   subsequent to ultrasonic welding the cable to the outer portion of the casing section, maintaining a pressure to the cable against the outer portion of the casing section for a hold time; and
   subsequent to the hold time, releasing the pressure from the cable against the outer portion of the casing section.

3. The method of claim 1, wherein ultrasonic welding the cable to the outer portion of the casing section is performable without halting the run-in-hole process.

4. The method of claim 1, wherein pressure is applied to the cable against the outer portion of the casing section using a piston of the ultrasonic weld head assembly.

5. The method of claim 4, wherein ultrasonic welding the cable to the outer portion of the casing section comprises:
   performing, using a horn of the ultrasonic weld head assembly, an ultrasonic weld in which the horn vibrates at between 20 kHz and 40 kHz for a pre-determined amount of time, the pre-determined amount of time being a weld time;
   holding, by the ultrasonic weld head assembly, the cable against the outer portion of the casing section for a hold time for allowing cooling to occur; and
   retracting the ultrasonic weld head assembly, upon completion of the hold time, from the cable and the outer portion of the casing section, the cable and the outer portion of the casing section being welded together.

6. The method of claim 1, further comprising:
   during the run-in-hole process for the casing section,
   applying pressure to an electro-acoustic transducer against an outer portion of the casing section; and
   ultrasonic welding the electro-acoustic transducer to the outer portion of the casing section while the pressure is applied to the electro-acoustic transducer against the outer portion of the casing section.

7. The method of claim 1, wherein the cable comprises a core and a cable encapsulation surrounding the core, and wherein the cable encapsulation comprises a pocket that holds a soldering material, an epoxy, a glue, or a combination thereof.

8. An ultrasonic weld head assembly comprising:
   a movable weld head housing with a plurality of weld heads mounted on a rotatable track, the plurality of weld heads being extendable from the movable weld head housing for ultrasonic welding a cable to an outer portion of a casing section during a run-in-hole process; and at least one sensor positionable to detect a position of each weld head of the plurality of weld heads with respect to the casing section and output a command to extend each weld head of the plurality of weld heads.

9. The ultrasonic weld head assembly of claim 8, wherein the movable weld head housing is positionable to perform operations comprising:

performing an ultrasonic weld in which a horn of each weld head of the plurality of weld heads vibrates at between 20 kHz and 40 kHz for a pre-determined amount of time.

10. The ultrasonic weld head assembly of claim 8, wherein each weld head of the plurality of weld heads comprises:

a piston positionable to apply pressure to the cable toward the casing section; and a horn positionable to perform an ultrasonic weld between the cable and the outer portion of the casing section.

11. The ultrasonic weld head assembly of claim 10, wherein the horn is further positionable to contact the cable during an ultrasonic welding operation and to avoid contact with the outer portion of the casing section during the ultrasonic welding operation.

12. The ultrasonic weld head assembly of claim 8, further comprising:

a sheave positionable to direct the cable into an alignment between the cable and the outer portion of the casing section.

13. The ultrasonic weld head assembly of claim 8, further comprising:

a casing holder positionable to maintain the casing section against the movable weld head housing.

14. The ultrasonic weld head assembly of claim 8, wherein the plurality of weld heads are extendable from the movable weld head housing using a pneumatic actuator or a piezo-electric stack actuator.

15. A system comprising:

a robotic arm positionable on a rig floor of a hydrocarbon well system;

an ultrasonic welding assembly positionable on the robotic arm, the ultrasonic welding assembly comprising:

a movable weld head housing with a plurality of weld heads mounted on a rotatable track, the plurality of weld heads being extendable from the weld head housing for ultrasonic welding a cable to an outer portion of a casing section during a run-in-hole process; and at least one sensor positionable to detect a position of each weld head of the plurality of weld heads with respect to the casing section and output a command to extend each weld head of the plurality of weld heads; and a casing holder positionable to maintain the casing section against the ultrasonic welding assembly.

16. The system of claim 15, wherein the robotic arm and the ultrasonic welding assembly are usable for ultrasonic welding a cable to an outer portion of the casing section during a run-in-hole process, and wherein an ultrasonic weld of the cable to the outer portion of the casing section is completed without stopping the run-in-hole process.

17. The system of claim 15, wherein the casing holder comprises a c-hook anvil.

18. The system of claim 17, wherein the ultrasonic welding assembly comprises a horn and a piston, and wherein the robotic arm and the ultrasonic welding assembly are positionable to perform operations comprising:

clamping a cable against an outer portion of the casing section between the ultrasonic welding assembly and the c-hook anvil;

performing an ultrasonic weld in which the horn vibrates at a frequency between 20 kHz and 40 kHz for a pre-determined amount of time;

holding, by the piston, the cable against the outer portion of the casing section for a hold time for allowing cooling to occur; and retracting the piston, after the hold time, from the cable and the outer portion of the casing section, the cable and the outer portion of the casing section being welded together.

19. The system of claim 18, wherein the horn of the ultrasonic welding assembly is positionable to contact the cable during performance of the ultrasonic weld and to avoid contact with an outer portion of the casing section during performance of the ultrasonic weld.

* * * * *